(12) United States Patent
Toida et al.

(10) Patent No.: US 7,379,290 B2
(45) Date of Patent: May 27, 2008

(54) ELECTRICALLY CONDUCTIVE POLYMER COMPOSITION AND SOLID ELECTROLYTIC CAPACITOR USING THE SAME

(75) Inventors: Sadamu Toida, Miyagi (JP); Shinji Arai, Toyama (JP); Kenji Araki, Toyama (JP); Katsuhiro Yoshida, Miyagi (JP); Tadamasa Asami, Toyama (JP); Takeshi Saitou, Miyagi (JP); Yuuichi Maruko, Toyama (JP)

(73) Assignee: NEC TOKIN Corporation, Miyagi (JP)

(*) Notice: Subject to any disclaimer, the term of this patent is extended or adjusted under 35 U.S.C. 154(b) by 143 days.

(21) Appl. No.: 11/356,676

(22) Filed: Feb. 17, 2006

(65) Prior Publication Data

US 2006/0187617 A1 Aug. 24, 2006

(30) Foreign Application Priority Data

Feb. 21, 2005 (JP) ............................. 2005-044370

(51) Int. Cl.
*H01G 9/00* (2006.01)
(52) U.S. Cl. .................. 361/523; 361/525; 361/528; 361/529; 361/534; 361/509; 29/25.01; 29/25.03
(58) Field of Classification Search ............... 361/523, 361/525, 528, 529, 534, 508–509, 516–519, 361/503–504, 302–305; 29/25.01, 25.03
See application file for complete search history.

(56) References Cited

U.S. PATENT DOCUMENTS 6,442,016 B2* 8/2002 Fukuyama et al. ......... 361/523
6,462,936 B1* 10/2002 Fujimoto et al. ........... 361/525
6,519,137 B1* 2/2003 Nitta et al. ................. 361/525
6,674,635 B1* 1/2004 Fife et al. ................... 361/523
6,687,118 B1* 2/2004 O'Phelan et al. ........... 361/508
6,852,250 B2* 2/2005 Haghighat et al. ......... 252/500
6,882,522 B2* 4/2005 Naito et al. ................. 361/523
7,256,982 B2* 8/2007 Lessner et al. ............. 361/516

FOREIGN PATENT DOCUMENTS

| JP | 01-313521 | 12/1989 |
| JP | 2015611 | 1/1990 |
| JP | 3-61331 B2 | 9/1991 |
| JP | 2001-023437 | 1/2001 |
| WO | WO 2004/063277 A1 | 7/2004 |

OTHER PUBLICATIONS

Patent Office of the People's Republic of China, "First Office Action" dated Nov. 2, 2007 for application 200610067346.9, entitled "Electrically conductive polymer . . . same".

* cited by examiner

*Primary Examiner*—Nguyen T. Ha
(74) *Attorney, Agent, or Firm*—Bradley N. Ruben

(57) ABSTRACT

An electrically conductive polymer composition contains an electrically conductive polymer obtained by using a polymer in the form of cations composed of repeating structural units of 3,4-ethylene dioxythiophene and polystyrene sulfonic acid as anions and further contains naphthalene sulfonic acid as an additive. A solid electrolytic capacitor 101 or a surface-mount transmission line element 102 has a polypyrrole conductive polymer layer 3 as a first solid electrolyte and a poly(3,4-ethylene dioxythiophene) conductive polymer layer 4 as a second solid electrolyte.

20 Claims, 4 Drawing Sheets

ELECTRICALLY CONDUCTIVE POLYMER COMPOSITION AND SOLID ELECTROLYTIC CAPACITOR USING THE SAME

The present application claims priority to prior Japanese application JP 2005-44370, the disclosure of which is incorporated herein by reference.

BACKGROUND OF THE INVENTION

This invention relates to a solid electrolyte for use in a solid electrolytic capacitor and further relates to a solid electrolytic capacitor and a surface-mount transmission line element each using such a solid electrolyte.

In recent years, a solid electrolytic capacitor has been developed which is obtained by forming a dielectric oxide film on a porous body of a valve-acting metal such as tantalum or aluminum by anodic oxidation and then forming on the oxide film an electrically conductive polymer layer as a solid electrolyte. Such solid electrolytic capacitors enable a reduction in equivalent series resistance (hereinafter referred to as "ESR") as compared with a conventional capacitor using manganese dioxide as a solid electrolyte and thus has started to be used in various applications.

When synthesizing an electrically conductive polymer that forms the conductive polymer layer of the solid electrolytic capacitor, use is made of 3,4-ethylene dioxythiophene (hereinafter referred to as "EDT"), pyrrole, aniline, or the like as a monomer. When forming the conductive polymer as the solid electrolyte of the capacitor, use is mainly made of a chemical oxidation polymerization method that forms the conductive polymer layer by adding an oxidant and dopant to the conductive polymer to cause reactions on the oxide film of the metal porous body (see, e.g.. Japanese Patent (JP-B) No. 3040113, hereinafter referred to as "patent document 1") or a method that uses, as a base, the conductive polymer layer formed by the chemical oxidation polymerization method and further increases the thickness thereof by the use of an electrolytic polymerization method (see, e.g. Japanese Examined Patent Publication (JP-B) No. H03-61331, hereinafter referred to as "patent document 2").

On the other hand, a technique is also used that, without carrying out the polymerization on the oxide film of the metal porous body, forms the conductive polymer layer on the oxide film by separately preparing a solution of a soluble conductive polymer, impregnating the polymer solution into the metal porous body, and then drying it into a coating film (see, e.g. Japanese Unexamined Patent Application Publication (JP-A) No. 2001-023437, hereinafter referred to as "patent document 3"). In the case of the technique of patent document 3, the molecular weight of the soluble conductive polymer and the permeability thereof into the inside of the porous body generally have an inverse relationship, while, the electrical resistance of the coating film tends to be proportional to the molecular weight of the conductive polymer. Therefore, if only the soluble conductive polymer solution is used for forming the solid electrolyte of the capacitor, the ESR and capacitance of the capacitor often have a trade-off relationship and, therefore, the example of such use is rare. Practically, soluble conductive polymer solutions are generally used such that (A) a soluble polymer having a large molecular weight is used to prepare a soluble polymer solution that can form a polymer layer with a low resistance although its permeability into a porous body is low, thereby forming a conductive polymer layer with a large thickness near the outermost surface of the porous body in combination with the chemical oxidation polymerization method, and (B) a soluble polymer having a small molecular weight is used to prepare a soluble polymer solution that can facilitate formation of a conductive polymer layer even inside a porous body although its resistance is high, thereby using it as a base in electrolytic polymerization in combination with the electrolytic polymerization method. EDT is a monomer that has started to be widely used and has a large feature that a low-resistance conductive polymer can be obtained and, therefore, also when EDT is used in a soluble conductive polymer, the using method like (A) is often employed. However, at present, even in the using method like (A), the conductive polymer formed by the soluble conductive polymer solution can only form a polymer layer having a resistivity that is several to 100 times higher or more as compared with the conductive polymer formed only by the chemical oxidation polymerization and, further, the stability at high temperatures is also inferior thereto and the resistance increases in a short time, which has been a problem in application to the solid electrolytic capacitor. In the case of a conductive polymer formed by a soluble conductive polymer solution containing EDT as a monomer, the resistance becomes lower as compared with a conductive polymer using another monomer such as, for example, pyrrole or aniline, but, as compared with the conductive polymer formed only the chemical oxidation polymerization, a polymer layer having a resistivity about 2 to 10 times higher can only be formed. Further, it has still been a problem that the stability at high temperatures is inferior thereto.

As examples of soluble conductive polymers containing EDT as a monomer, for example Japanese Unexamined Patent Application Publication (JP-A) No. H01-313521 (hereinafter referred to as "patent document 4") has proposed and, with respect particularly to the water-soluble conductive polymers, Baytron-P manufactured by H. C. Starck—V TECH Ltd. and so on are on the market. However, those polymers have high electrical resistances and notably increase in electrical resistance at temperatures of about 100° C., and therefore, cannot be applied to solid electrolytes of capacitors as they are.

SUMMARY OF THE INVENTION

It is therefore an object of this invention to provide an electrically conductive polymer composition capable of obtaining a coating film that is made of a water-soluble conductive polymer containing EDT and has a reduced resistivity, and further, that can maintain such a low resistivity even in a high-temperature environment.

It is another object of this invention to provide a solid electrolytic capacitor having excellent ESR characteristics by applying the coating film of the foregoing conductive polymer composition.

It is still another object of this invention to provide a surface-mount transmission line element having excellent ESR characteristics by applying the coating film of the foregoing conductive polymer composition.

According to one aspect of the present invention, there is provided an electrically conductive polymer composition containing an electrically conductive polymer obtained by using a polymer in the form of cations comprising repeating structural units of 3,4-ethylene dioxythiophene given by the following formula 1,

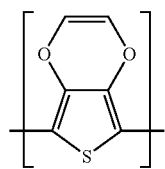

(1)

and polystyrene sulfonic acid, as anions, given by the following formula 2,

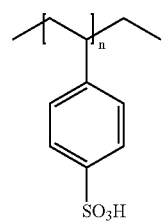

(2)

and further containing naphthalene sulfonic acid as an additive.

According to another aspect of the present invention, there is provided a solid electrolytic capacitor which comprises an anode body made of a valve-acting metal, an oxide film formed on. a surface of said valve-acting metal, a first solid electrolyte layer formed so as to. reach the oxide film inside said valve-acting metal, a second solid electrolyte. layer formed at an outer periphery of the first solid electrolyte layer, and a conductor layer formed on the second solid electrolyte layer. In the aspect of the present invention, the anode body serves as an anode and the conductor layer as a cathode and terminal portions of the anode and cathode are respectively formed. The solid electrolytic capacitor uses, as at least one of the first and second solid electrolyte layers, an electrically conductive polymer composition containing an electrically conductive polymer obtained by using a polymer in the form of cations comprising repeating structural units of 3,4-ethylene dioxythiophene given by the formula 1, and polystyrene sulfonic acid, as anions, given by the formula 2, and further containing naphthalene sulfonic acid as an additive.

According to still another aspect of the present invention, there is provided a transmission line element which comprises an anode body made of a valve-acting metal, an oxide film formed on a surface of a center portion of said anode body, a first solid electrolyte layer formed on the oxide film inside said valve-acting metal, a second solid electrolyte layer formed on the oxide film at an outer periphery of the valve-acting metal, and a conductor layer formed on the second solid electrolyte layer. In the aspect of the present invention, both ends of the center portion of said valve-acting metal serve as a pair of anodes and said conductor layer as a cathode and terminal portions of the anodes and cathode are respectively formed. The transmission line element uses, as at least one of said first and second solid electrolyte layers, an electrically conductive polymer composition containing an electrically conductive polymer obtained by using a polymer in the form of cations comprising repeating structural units of 3,4-ethylene dioxythiophene given by the formula 1, and polystyrene sulfonic acid, as anions, given by the formula 2, and further containing naphthalene sulfonic acid as an additive.

According to yet another aspect of the present invention, there is provided a method of manufacturing a solid electrolytic capacitor, which comprises the steps of preparing an anode body made of a valve-acting metal, forming an oxide film on a surface of said valve-acting metal, forming a first solid electrolyte layer so as to reach the oxide film inside said valve-acting metal, forming a second solid electrolyte layer at an outer periphery of said first solid electrolyte layer, forming a conductor layer on said second solid electrolyte layer, and forming terminal portions of an anode and a cathode. The anode body serves as the anode and the conductor layer serves as said cathode. In the aspect of the present invention, at least one of the first and second solid electrolyte layers is made of an electrically conductive polymer formed by polymerization from an aqueous solution containing a polymer in the form of cations comprising repeating structural units of 3,4-ethylene dioxythiophene given by the formula 1, and anions of polystyrene sulfonic acid given by the formula 2, and further containing naphthalene sulfonic acid as an additive.

According to a further aspect of the present invention, there is provided a method of manufacturing a transmission line element which comprises the steps of forming an oxide film on a surface of a center portion of an anode body made of a valve-acting metal, forming a first solid electrolyte layer on the oxide film inside the valve-acting metal, forming a second solid electrolyte layer on the oxide film at an outer periphery of the valve-acting metal, forming a conductor layer on said second solid electrolyte layer, and forming terminal portions of a pair of anodes and a cathode. Both ends of the center portion of the valve-acting metal serve as said pair of anodes and the conductor layer serve as said cathode. In the aspect of the present invention, at least one of said first and second solid electrolyte layers is made of an electrically conductive polymer formed by polymerization from an aqueous solution containing a polymer in the form of cations comprising repeating structural units of 3,4-ethylene dioxythiophene given by the formula 1, and anions of polystyrene sulfonic acid given by the formula 2, and further containing naphthalene sulfonic acid as an additive.

DESCRIPTION OF THE PREFERRED EMBODIMENT

Figure 1:
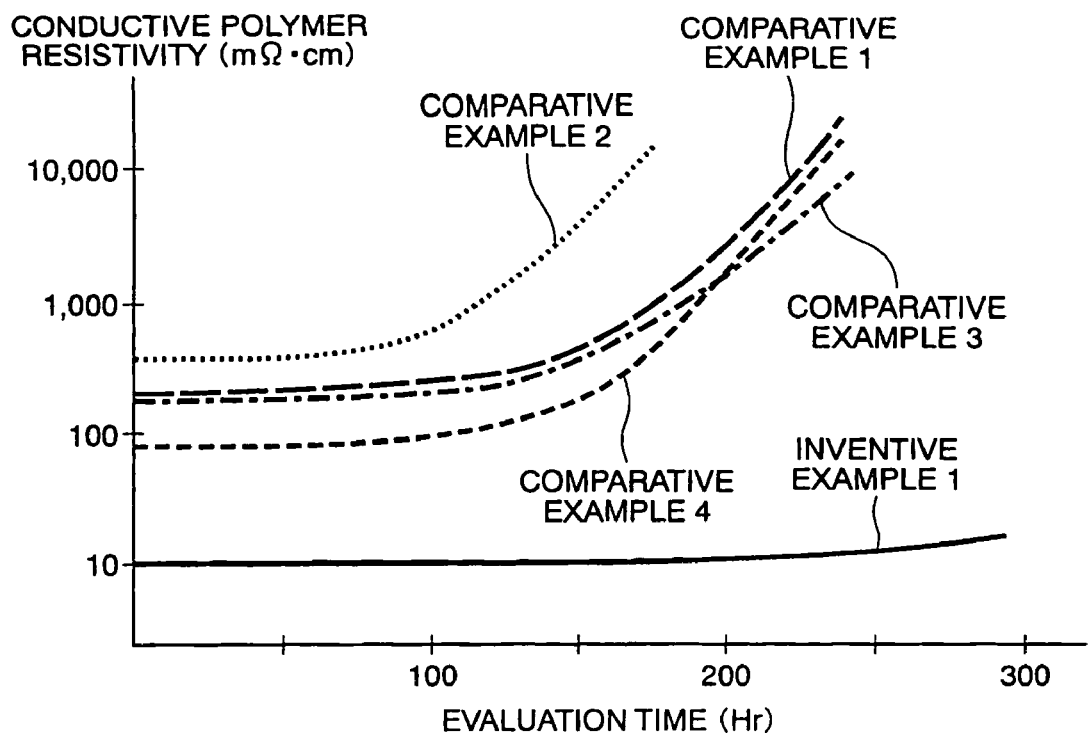
FIG. 1 is a graph showing behaviors, in an atmospheric atmosphere at 150° C., of a coating film formed by an electrically conductive polymer aqueous solution produced in Example 1 of this invention and coatings films of Comparative Examples 1 to 4.

At first, the principle of this invention will be described.

This invention relates to a technique of reducing the resistance of and suppressing an increase in resistance, at high temperatures, of a conductive polymer having, as a base, a water-soluble polymer with a structure in which polystyrene sulfonic acid (hereinafter referred to as "PSSA") is doped when polymerizing EDT (hereinafter, polymerized EDT will be referred to as "PEDT").

The increase in resistance of the conductive polymer is mainly caused by undoping of PSSA in the high-temperature environment and oxidation of the polymer.

The present inventors have found that undoping of PSSA can be suppressed by adding naphthalene sulfonic acid (hereinafter referred to as "NSA") as an additive when synthesizing a water-soluble polymer. With respect to the undoping suppression mechanism, there still exists an ambiguous portion. In this regard, when use is made of a typical dopant for a conductive polymer, such as para-toluene sulfonic acid (hereinafter referred to as "TSA") or dodecylbenzene sulfonic acid (hereinafter referred to as "DBSA") being aromatic sulfonic acid, in an aqueous solution without using PSSA or when a polymer doped with only NSA is produced, a low-resistance conductive polymer film cannot be obtained and, further, an increase in resistance at high temperatures cannot be suppressed. In view of this, it is speculated that the foregoing NSA as the additive does not act on PEDT as a dopant but acts on doped PSSA to suppress undoping thereof. Further, since it is difficult to dope NSA into PEDT even by the use of the chemical oxidation polymerization method while NSA is easily bonded to PSSA, it is considered that the action as speculated above is correct.

It has also been confirmed that the molecular weight of PSSA is preferably what is obtained by polymerizing 50 or more molecules in average of monomolecular styrene sulfonic acid (molecular weight:184.2). In combination with the foregoing addition of NSA, there is obtained a water-soluble polymer having a low resistance and exhibiting only a small increase in resistance at high temperatures. By applying a solution of such a soluble (water-soluble) conductive polymer to a solid electrolytic capacitor, the ESR and high-temperature characteristics are improved as compared with the capacitor using the conventional soluble conductive polymer.

Now, specific examples of this invention will be described with reference to the drawings.

EXAMPLE 1

In Example 1 of this invention, the weight ratio composition of respective materials to be used was set to EDT:1, PSSA:2.6, NSA:1.5, and oxidant:1 given that pure water was 100. PSSA was used in the form of a 20% aqueous solution of PSSA having an average molecular weight of 14,000, NSA was used in the form of a 10% aqueous solution, and ammonium peroxodisulphate (hereinafter referred to as "APS") powder was used as the oxidant. When the aqueous solution was used, the weight ratio was given as a value corresponding to the solid part thereof. The foregoing materials ad the pure water were put into a container and then stirred with a stirrer so that polymerization proceeded. In this event, APS serving as the oxidant was added dividedly after uniformly stirring and mixing EDT, PSSA, and NSA being the base materials. This is because if a large amount of the oxidant is added at one time, variation in molecular weight of a conductive polymer to be obtained increases so that there are produced more molecules having small molecular weights or more molecules that coagulate into particles. In Example 1 of this invention, the total stirring time was set to 96 hours, wherein the total adding amount of APS was divided into three units and only the base materials were stirred and mixed without adding APS in the first 24 hours, and then, the single unit amount of APS was added per 24 hours. For comparison, conductive polymers were also produced in the case where NSA was not used (Comparative Example 1), in the case where the average molecular weight of PSSA was set to 50,000 (Comparative Example 2), and in the case where the average molecular weight of PSSA was set to 10,000 (Comparative Example 3). In Comparative Examples 1 to 3, the conductive polymers were synthesized in the same manner (composition ratio and process) as in Example 1 except that NSA was not used or the average molecular weight of PSSA differed therefrom. Further, in Comparative Example 4, a conductive polymer was produced by adding, instead of NSA, TSA at a weight ratio of 1.24 relative to pure water 100 in Example 1. The adding amount of TSA was set so as to be equal to the adding amount of NSA in mol. A conductive polymer aqueous solution produced in Example 1 of this invention and conductive polymer aqueous solutions produced in Comparative Examples 1 to 4 were dropped on glass plates and then dried into coating films, respectively. The thickness and resistance value of each coating film were measured to derive a resistivity. The results are shown in Table 1 below. It has been found that the coating film of the conductive polymer solution produced in Example 1 of this invention exhibits the lowest resistivity.

TABLE 1

| Measurement Object | Inventive Example 1 | Comparative Example | | | |
|---|---|---|---|---|---|
| | | 1 | 2 | 3 | 4 |
| Resistivity | 10 mΩ · cm | 219 mΩ · cm | 548 mΩ · cm | 197 mΩ · cm | 88 mΩ · cm |

FIG. 1 shows changes in resistivity of the foregoing five kinds of coating films when they were left standing in an atmospheric atmosphere at 150° C. It is understood that the coating film of Example 1 of this invention exhibits almost no change in resistivity and is excellent. The coating film of Comparative Example 4 exhibits a low initial resistivity but notably increases in resistance at high temperatures, and shows substantially the same behavior as the coating film of Comparative Example 1 where NSA was not added. From this, it is understood that it is not enough for the adding acid to only serve well as the dopant.

EXAMPLE 2

Figure 2:
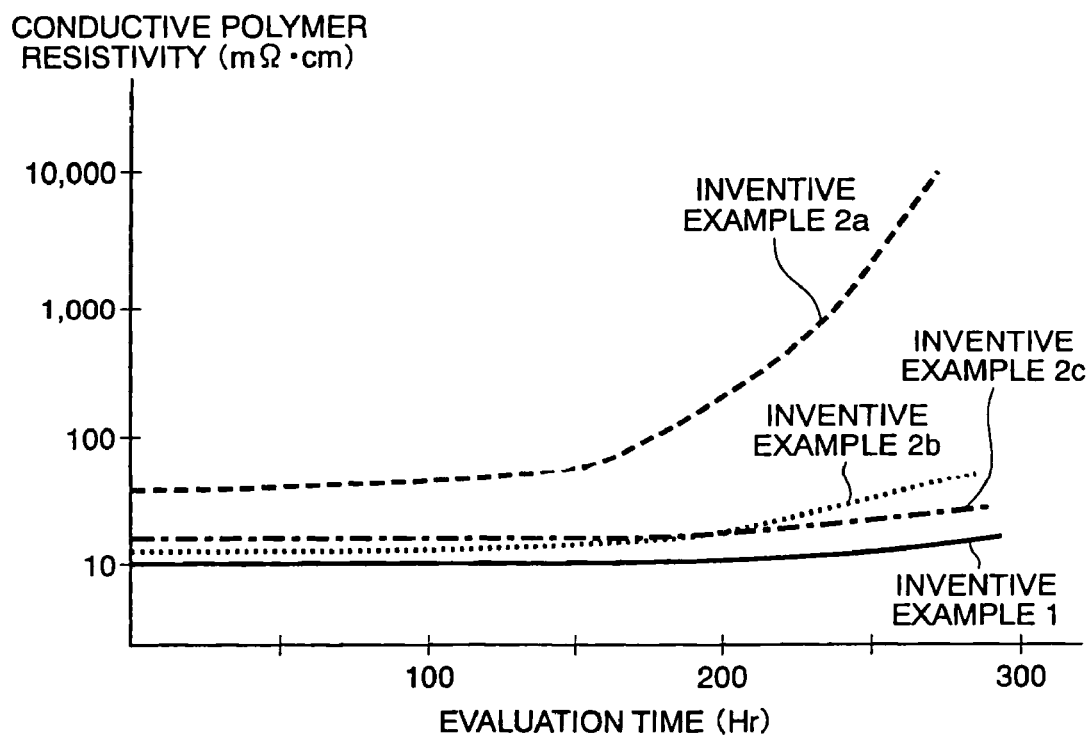
FIG. 2 is a graph comparing behaviors, in an atmospheric atmosphere at 150° C., of coating films formed by electrically conductive polymer aqueous solutions produced in Example 2 of this invention and the coating film of Example 1 of this invention.

In Example 2 of this invention, conductive polymer aqueous solutions were produced in the same manner as in Example 1 except that the weight composition ratios of NSA were set to 0.5, 1.0, and 2.0 relative to pure water 100, respectively (hereinafter, the respective compositions will be referred to as Examples 2a, 2b, and 2c). These solutions were dropped on glass plates to obtain coating films like in Example 1. The resistivity of each coating film is shown in Table 2 below in comparison with Example 1. FIG. 2 shows changes in resistivity of those coating films when they were left standing in an atmospheric atmosphere at 150° C.

TABLE 2

| Measurement Object | Inventive Example 1 | Inventive Example 2a | Inventive Example 2b | Inventive Example 2c |
|---|---|---|---|---|
| Resistivity | 10 mΩ · cm | 50 mΩ · cm | 13 mΩ · cm | 17 mΩ · cm |

It is understood from Table 2 that although there is almost no difference between Example 1 and Examples 2a to 2c, the coating film of Example 1 exhibits the lowest resistivity and, further, it is understood from the results in FIG. 2 that the coating film of Example 1 is also excellent with respect to an increase in resistance at high temperatures. From this, it is understood that the NSA composition ratio around 1.5 is preferable in terms of the resistivity and the suppression of the increase in resistivity at high temperatures.

EXAMPLE 3

Figure 3A:
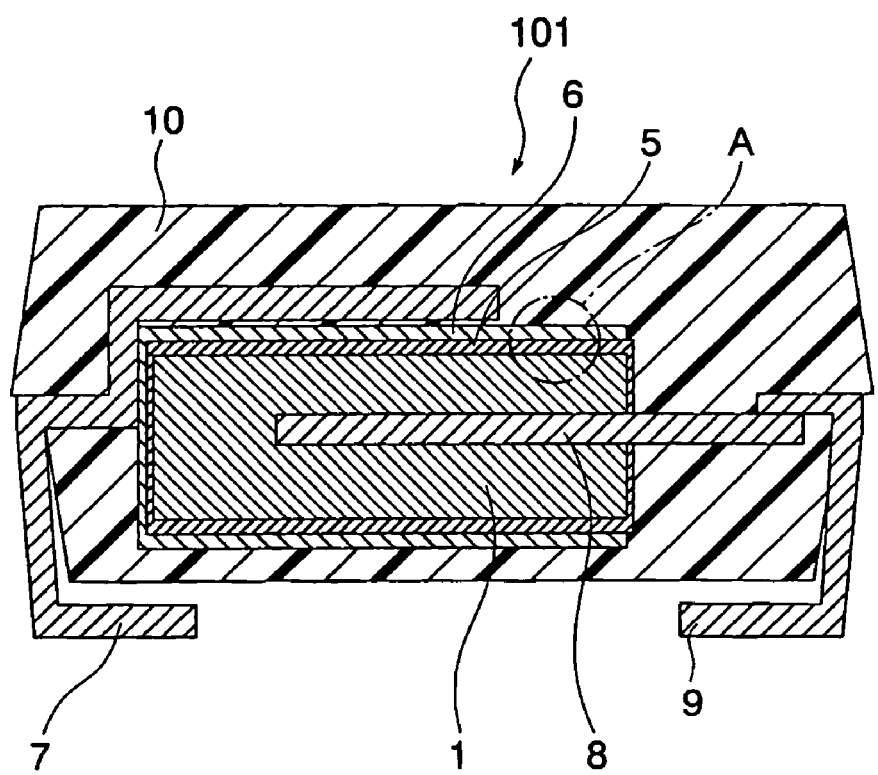
FIG. 3A is a sectional view showing a structure of a tantalum solid electrolytic capacitor produced in Example 3 of this invention.
Figure 3B:
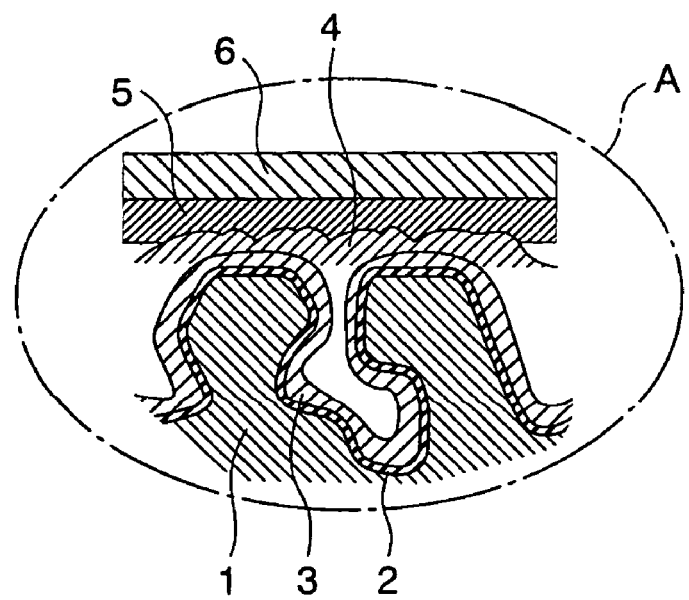
FIG. 3B is an enlarged view of a portion A of the solid electrolytic capacitor illustrated in FIG. 3A.

In Example 3 of this invention, a solid electrolytic capacitor 101 as shown in FIGS. 3A and 3B was produced by the use of the conductive polymer aqueous solution produced in Example 1.

Figure 4:
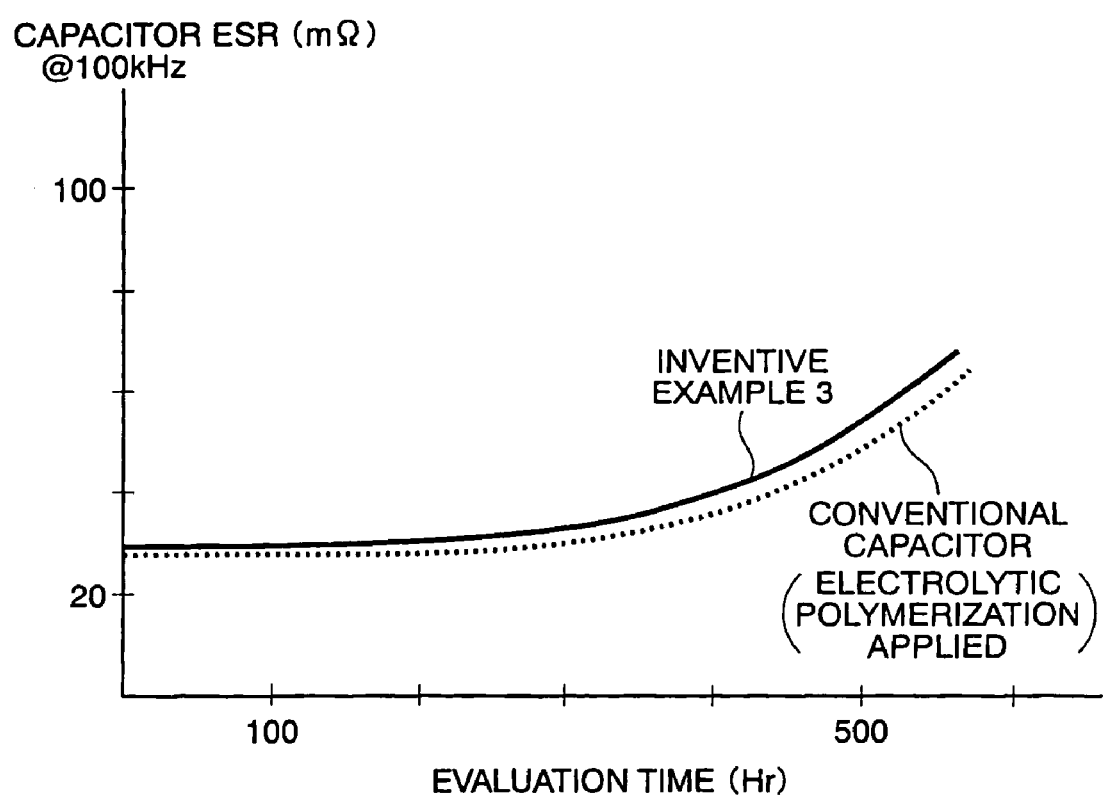
FIG. 4 is a graph comparing ESR behaviors, in an atmospheric atmosphere at 105° C., of the tantalum solid electrolytic capacitor produced in Example 3 of this invention and a conventional capacitor of Japanese Unexamined Patent Application Publication (JP-A) No. 2003-272954 (hereinafter referred to as "patent document 5")

Tantalum was used as a valve-acting metal for the solid electrolytic capacitor shown in FIG. 3A and, according to the known method described in patent document 5 or the like, a tantalum porous body 1 was produced from tantalum powder and an oxide film 2 was formed on the metal surface of the porous body 1 by anodic oxidation. By chemical oxidation polymerization using a pyrrole monomer and dodecylbenzene sulfonic acid iron, a polypyrrole conductive polymer layer 3 was formed, as a first solid electrolyte layer, on the oxide film 2 inside the tantalum porous body 1. In the example of patent document 5, a conductive polymer layer is then formed by electrolytic polymerization. However, in Example 3 of this invention, such a layer was formed by the use of the conductive polymer aqueous solution containing EDT produced in Example 1. Specifically, the element formed with the polypyrrole conductive polymer layer 3 was immersed in the conductive polymer aqueous solution of Example 1 for 5 minutes, then taken out and subjected to preliminary drying in an atmospheric atmosphere at 85° C. for 20 minutes, and then heated at 150° C. for 30 minutes, thereby forming a poly (3,4-ethylene dioxythiophene) conductive polymer layer 4 being a second solid electrolyte layer on the outermost surface of the element. Such a method of this invention is much simpler than the electrolytic polymerization method in the example of patent document 5. Thereafter, a graphite layer 5 and a silver layer 6 were formed on the conductive polymer layer 4 by paste coating and curing, then a cathode drawing lead 7 was connected to the silver layer 6 and an anode drawing lead 9 was attached to a tantalum anode lead 8, and then the element thus obtained was covered with a mold resin 10, thereby obtaining the tantalum solid electrolytic capacitor 101. FIG. 4 shows changes in ESR when the solid electrolytic capacitor 101 and a solid electrolytic capacitor obtained by the electrolytic polymerization method in the example disclosed in patent document 5 were left standing in an atmospheric atmosphere at 105° C. The produced solid electrolytic capacitors were each 4V-rated with 220 μF. It is understood that the capacitor in Example 3 of this invention exhibits the ESR characteristics comparable to those of the capacitor applied with the electrolytic polymerization. In Example 3 of this invention, tantalum was used as the valve-acting metal. However, instead of it, aluminum, niobium, or the like may be used as a valve-acting metal to thereby produce a solid electrolytic capacitor.

EXAMPLE 4

Figure 5:
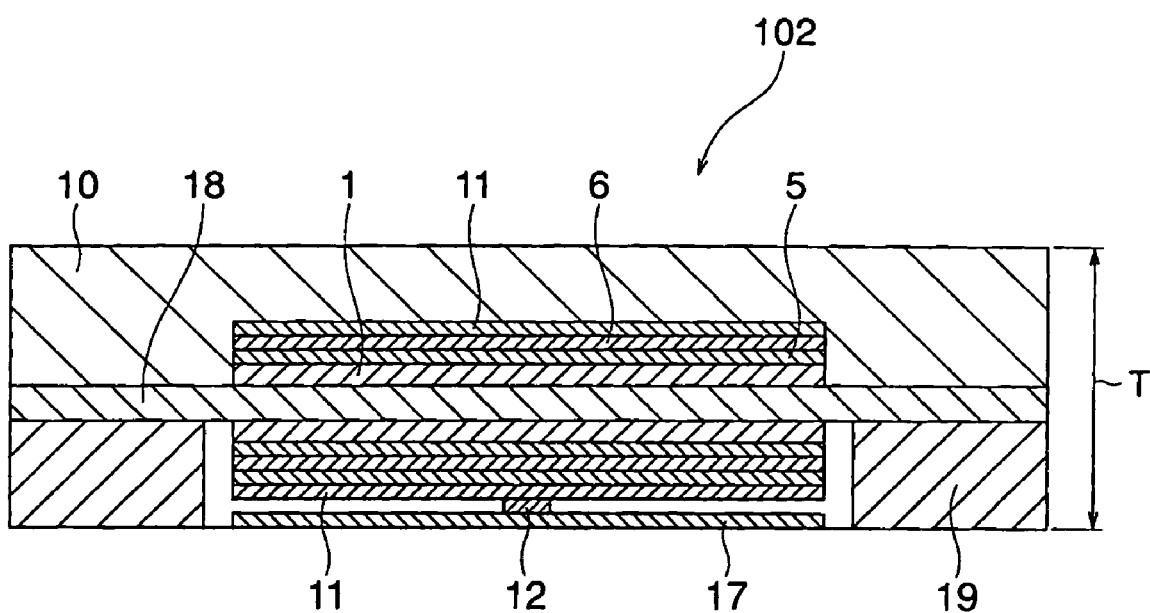
FIG. 5 is a sectional view showing a structure of a surface-mount transmission line element produced in Example 4 of this invention.

In Example 4 of this invention, a surface-mount transmission line element 102 as shown in FIG. 5 was produced by the use of the conductive polymer aqueous solution produced in Example 1.

Tantalum was used as a valve-acting metal for the surface-mount transmission line element shown in FIG. 5 and, according to the known method described in patent document 5 or the like, a tantalum porous body 1 was produced from tantalum powder and an oxide film 2 was formed on the metal surface of the porous body 1 by anodic oxidation like in FIG. 3B. By chemical oxidation polymerization using a pyrrole monomer and dodecylbenzene sulfonic acid iron, a polypyrrole conductive polymer layer 3 was formed, as a first solid electrolyte layer, on the oxide film 2 inside the tantalum porous body 1 like in FIG. 3B.

In Example 4 of this invention, a conductive polymer layer as a second solid electrolyte layer was formed by the use of the conductive polymer aqueous solution containing EDT produced in Example 1. Specifically, the element formed with the polypyrrole conductive polymer layer 3 was immersed in the conductive polymer aqueous solution of Example 1 for 5 minutes, then taken out and subjected to preliminary drying in an atmospheric atmosphere at 85° C. for 20 minutes, and then heated at 150° C. for 30 minutes, thereby forming a poly (3,4-ethylene dioxythiophene) conductive polymer layer 4 as the second solid electrolyte layer on the outermost surface of the element. Thereafter, a graphite layer 5 and a silver layer 6 were formed on the conductive polymer layer 4 by paste coating and curing, then a metal plate 11 was connected to the silver layer 6 and a cathode terminal metal plate 17 was further connected via the metal plate 11 on the lower side, then an anode terminal metal plate 19 was attached to a tantalum anode plate 18, and then the element thus obtained was covered with a mold resin 10, thereby obtaining the surface-mount transmission line element 102. Numeral 12 denotes a joining portion between the metal plate 11 and the cathode terminal metal plate 17. However, this structure may be in the form of a single integrally formed cathode terminal metal plate 11 or 17.

The surface-mount transmission line element 102 in Example 4 of this invention achieves the ESR characteristics comparable to those of the conventional one like the capacitor 101 produced in Example 3. The element 102 has a height T lower than that of the capacitor 101 and is thus a thin type. In Example 4 of this invention, tantalum was used as the valve-acting metal. However, instead of it, aluminum, niobium, or the like may be used as a valve-acting metal to thereby produce a surface-mount transmission line element.

As described above, the conductive polymer composition of this invention is used in the solid electrolytic capacitor or the transmission line element. The solid electrolytic capacitor is applied to an electrical component, an electronic component, or a circuit element of an electrical or electronic device. The transmission line element is applied to stabilization of a power supply circuit or a decoupling circuit.

What is claimed is:

1. An electrically conductive polymer composition containing an electrically conductive polymer obtained by using a polymer in the form of cations comprising repeating structural units of 3,4-ethylene dioxythiophene given by the following formula 1,

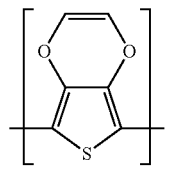

(1)

and polystyrene sulfonic acid, as anions, given by the following formula 2,

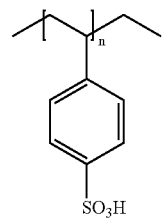

(2)

and further containing naphthalene sulfonic acid as an additive.

2. An electrically conductive polymer composition according to claim 1, wherein said polystyrene sulfonic acid being the anion has an average molecular weight of 10,000 or more.

3. An electrically conductive polymer composition according to claim 1, wherein said electrically conductive polymer composition contains said naphthalene sulfonic acid at a weight ratio of 0.5 or more relative to pure water 100 given that said polymer in the form of the cations is contained at a weight ratio of 1 relative to the pure water 100.

4. An electrically conductive polymer composition according to claim 1, wherein said polystyrene sulfonic acid has an average molecular weight of 10,000 or more and a concentration of said naphthalene sulfonic acid added to said electrically conductive polymer is a weight ratio of 0.5 or more relative to pure water 100 given that said polymer in the form of the cations is contained at a weight ratio of 1 relative to the pure water 100.

5. A solid electrolytic capacitor comprising an anode body made of a valve-acting metal, an oxide film formed on a surface of said valve-acting metal, a first solid electrolyte layer formed so as to reach the oxide film inside said valve-acting metal, a second solid electrolyte layer formed at an outer periphery of said first solid electrolyte layer, and a conductor layer formed on said second solid electrolyte layer, wherein said anode body serves as an anode and said conductor layer as a cathode and terminal portions of said anode and cathode are respectively formed, said solid electrolytic capacitor using, as at least one of said first and second solid electrolyte layers, an electrically conductive polymer composition containing an electrically conductive polymer obtained by using a polymer in the form of cations comprising repeating structural units of 3,4-ethylene dioxythiophene given by the following formula 1,

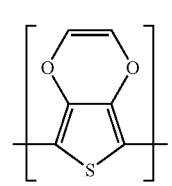

(1)

and polystyrene sulfonic acid, as anions, given by the following formula 2,

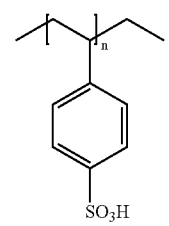

(2)

and further containing naphthalene sulfonic acid as an additive.

6. A solid electrolytic capacitor according to claim 5, wherein said polystyrene sulfonic acid being the anion has an average molecular weight of 10,000 or more.

7. A solid electrolytic capacitor according to claim 5, wherein said electrically conductive polymer composition contains said naphthalene sulfonic acid at a weight ratio of 0.5 or more relative to pure water 100 given that said polymer in the form of the cations is contained at a weight ratio of 1 relative to the pure water 100.

8. A solid electrolytic capacitor according to claim 5, wherein said polystyrene sulfonic acid has an average molecular weight of 10,000 or more and a concentration of said naphthalene sulfonic acid added to said electrically conductive polymer is a weight ratio of 0.5 or more relative to pure water 100 given that said polymer in the form of the cations is contained at a weight ratio of 1 relative to the pure water 100.

9. A solid electrolytic capacitor according to claim 5, wherein said valve-acting metal is at least one of tantalum, niobium, and aluminum, said anode body is a valve-acting metal porous body formed on a valve-acting metal anode lead, said oxide film is formed on the surface of said valve-acting metal porous body, said first solid electrolyte layer is formed so as to reach said oxide film inside said valve-acting metal porous body, and said second solid electrolyte layer is formed at the outer periphery of said first solid electrolyte layer.

10. A solid electrolytic capacitor according to claim 5, wherein said conductor layer includes at least one of a silver layer and a carbon layer.

11. A solid electrolytic capacitor according to claim 5, wherein said terminal portions are metal lines or metal strips electrically connected to an anode lead and said conductor layer, respectively.

12. A transmission line element comprising an anode body made of a valve-acting metal, an oxide film formed on a surface of a center portion of said anode body, a first solid electrolyte layer formed on the oxide film inside said valve-acting metal, a second solid electrolyte layer formed on the oxide film at an outer periphery of said valve-acting metal, and a conductor layer formed on said second solid electrolyte layer, wherein both ends of the center portion of said valve-acting metal serve as a pair of anodes and said conductor layer as a cathode and terminal portions of said anodes and cathode are respectively formed, said transmission line element using, as at least one of said first and second solid electrolyte layers, an electrically conductive polymer composition containing an electrically conductive polymer obtained by using a polymer in the form of cations comprising repeating structural units of 3,4-ethylene dioxythiophene given by the following formula 1,

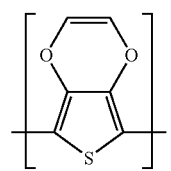

(1)

and polystyrene sulfonic acid, as anions, given by the following formula 2,

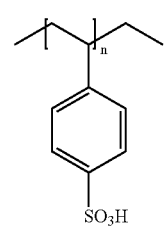

(2)

and further containing naphthalene sulfonic acid as an additive.

13. A transmission line element according to claim 12, wherein said polystyrene sulfonic acid being the anion has an average molecular weight of 10,000 or more.

14. A transmission line element according to claim 12, wherein said electrically conductive polymer composition contains said naphthalene sulfonic acid at a weight ratio of 0.5 or more relative to pure water 100 given that said polymer in the form of the cations is contained at a weight ratio of 1 relative to the pure water 100.

15. A transmission line element according to claim 12, wherein said polystyrene sulfonic acid has an average molecular weight of 10,000 or more and a concentration of said naphthalene sulfonic acid added to said electrically conductive polymer is a weight ratio of 0.5 or more relative to pure water 100 given that said polymer in the form of the cations is contained at a weight ratio of 1 relative to the pure water 100.

16. A transmission line element according to claim 12, wherein said valve-acting metal is at least one of tantalum, niobium, and aluminum, said anode body comprises a valve-acting metal plate and a porous body of said valve-acting metal formed on said valve-acting metal plate, said oxide film is formed on the surface of said valve-acting metal porous body, said first solid electrolyte layer is formed so as to reach said oxide film inside said valve-acting metal porous body, and said second solid electrolyte layer is formed at the outer periphery of said first solid electrolyte layer.

17. A transmission line element according to claim 12, wherein said conductor layer includes at least one of a silver layer and a carbon layer.

18. A transmission line element according to claim 12, wherein said terminal portions are metal plates electrically connected to an anode plate and said conductor layer, respectively.

19. A method of manufacturing a solid electrolytic capacitor, comprising the steps of:
preparing an anode body made of a valve-acting metal;
forming an oxide film on a surface of said valve-acting metal, forming a first solid electrolyte layer so as to reach the oxide film inside said valve-acting metal;
forming a second solid electrolyte layer at an outer periphery of said first solid electrolyte layer;
forming a conductor layer on said second solid electrolyte layer; and
forming terminal portions of an anode and a cathode said anode body serving as said anode and said conductor layer serving as said cathode, wherein at least one of said first and second solid electrolyte layers is made of an electrically conductive polymer formed by polymerization from an aqueous solution containing a polymer in the form of cations comprising repeating structural units of 3,4-ethylene dioxythiophene given by the following formula 1,

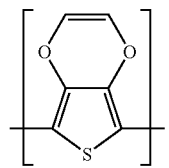

(1)

and anions of polystyrene sulfonic acid given by the formula 2,

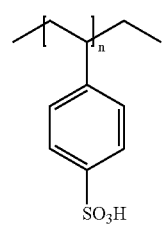

(2)

and further containing naphthalene sulfonic acid as an additive.

20. A method of manufacturing a transmission line element comprising the steps of:

forming an oxide film on a surface of a center portion of an anode body made of a valve-acting metal;

forming a first solid electrolyte layer on the oxide film inside said valve-acting metal;

forming a second solid electrolyte layer on the oxide film at an outer periphery of said valve-acting metal;

forming a conductor layer on said second solid electrolyte layer; and forming terminal portions of a pair of anodes and a cathode, both ends of the center portion of said valve-acting metal serving as said pair of anodes and said conductor layer serving as said cathode, wherein at least one of said first and second solid electrolyte layers is made of an electrically conductive polymer formed by polymerization from an aqueous solution containing a polymer in the form of cations comprising repeating structural units of 3,4-ethylene dioxythiophene given by the following formula 1,

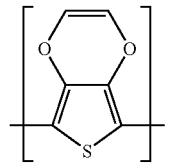

(1)

and anions of polystyrene sulfonic acid given by the following formula 2,

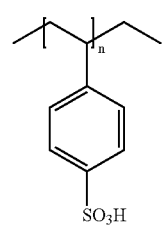

(2)

and further containing naphthalene sulfonic acid as an additive.

* * * * *